United States Patent [19]

Obley

[11] Patent Number: 4,707,628
[45] Date of Patent: Nov. 17, 1987

[54] DYNAMOELECTRIC MACHINE ROLL BACK COLLECTOR HOUSING

[75] Inventor: Alan L. Obley, Altamonte Springs, Fla.

[73] Assignee: Westinghouse Electric Corp., Pittsburgh, Pa.

[21] Appl. No.: 896,536

[22] Filed: Aug. 14, 1986

[51] Int. Cl.$^4$ .............................................. H02K 5/10
[52] U.S. Cl. ................................... 310/89; 310/227; 310/228
[58] Field of Search .................. 310/89, 88, 56, 227, 310/228, 50

[56] References Cited

U.S. PATENT DOCUMENTS

| | | | |
|---|---|---|---|
| 878,167 | 2/1908 | Webster | 310/89 |
| 1,300,637 | 4/1919 | Oglesby | 310/89 X |
| 1,471,834 | 10/1923 | Defibaugh | 310/89 X |
| 1,575,660 | 3/1926 | Teipel | 310/88 |
| 2,499,190 | 2/1950 | Holmgren | 310/89 |
| 3,662,198 | 5/1972 | Adams | 310/89 |
| 3,840,762 | 10/1974 | Kajabian | 310/50 |

Primary Examiner—Donovan F. Duggan
Attorney, Agent, or Firm—G. H. Telfer

[57] ABSTRACT

A collector housing over the collector and brush assembly of a dynamoelectric machine is provided with a special valve called a vacuum breaker for permitting by manual operation the alleviation of negative pressure within the housing while the machine is in operation so that the collector housing may be rolled back from its normal location for inspection and maintenance of the collectors and brushes.

4 Claims, 4 Drawing Figures

FIG. 3
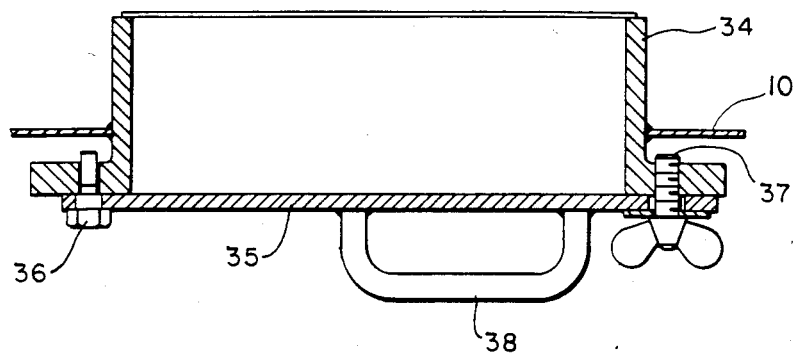
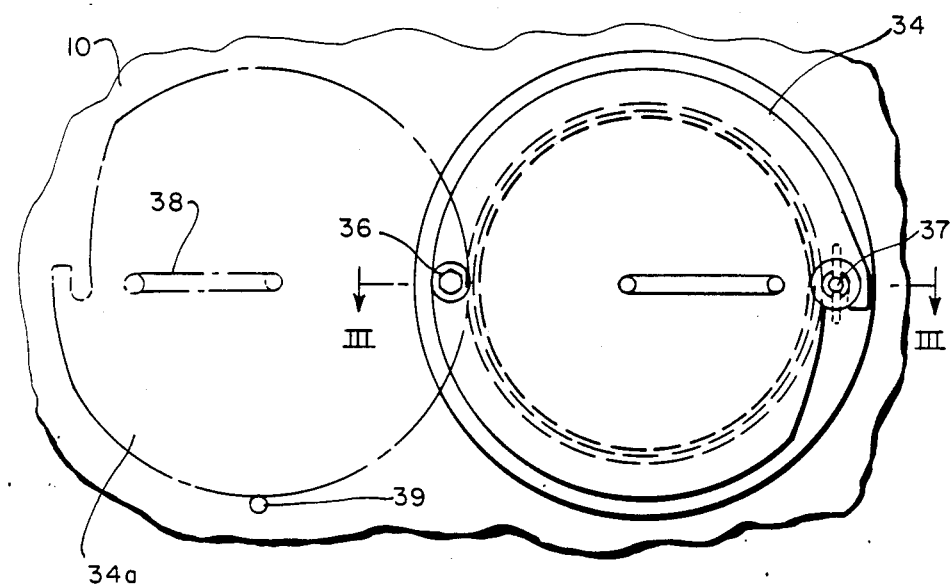
FIG. 4

DYNAMOELECTRIC MACHINE ROLL BACK COLLECTOR HOUSING

BACKGROUND AND SUMMARY OF THE INVENTION

This invention relates to dynamoelectric machines such as large generators that have brushes and collector rings located in a movable housing.

In the past, machines have been built with a housing enclosing collector rings and brushes on an extended portion of the rotor shaft. The housing has a closed position with an interface against a fixed wall but can be moved by rolling or sliding to an open position allowing inspection and maintenance of the collector rings and brushes while the machine is in operation. The housing is equipped for forced air cooling that results in a relatively high negative pressure within the housing of, for example, 15 to 20 inches of water. This means that for a typical surface area at the interface of about 3300 sq. in., the direct force required to open the housing while the machine and the ventilation system are in operation is roughly about 2400 lbs. While the actual force required can be reduced by the use of the mechanical advantage of a lever, a prohibitively long lever may be required to achieve sufficient mechanical advantage for a moderate size person to move the housing in a given case.

To avoid the foregoing problems, which is the object of the present invention, there is provided a device to markedly reduce the pressure differential without the exercise of any large manual force. This device, which may be referred to as a "housing access flow control device" or a "vacuum breaker" (since its effect is to relieve the partial vacuum within the housing) is, according to a preferred embodiment of the invention, a portal valve located in a surface of the housing for manual opening prior to the housing being forced away from the interface with the stationary wall. The portal valve may occupy a surface area of the housing that is less than that of the sealed interface by at least about an order of magnitude. Upon its opening, with a manual force of no more than about 15 to 20 pounds, the pressure is relieved and separation at the interface can be readily performed since the force required to pull back the housing is now about 5 to 10% of that required formerly.

The portal valve comprises a pivot plate secured at an edge to a fixed pivot pin. Opposite the fixed pivot pin there is a closure mechanism which may be a screw fastener. The plate has on it a handle for enabling manual rotation of the pivot plate around the pivot pin. Additionally it is preferred that the portal valve have located internally in it a screen to prevent entry of extraneous material as the air pressure within the housing is raised and there is a large inrush from the exterior of the housing.

BRIEF DESCRIPTION OF THE DRAWINGS

FIG. 3 shows a cross-section of the portal valve of FIG. 2; and

FIG. 4 is an elevation view showing the portal valve of FIGS. 2 and 3 in its open position.

DESCRIPTION OF THE PREFERRED EMBODIMENTS

Figure 1:
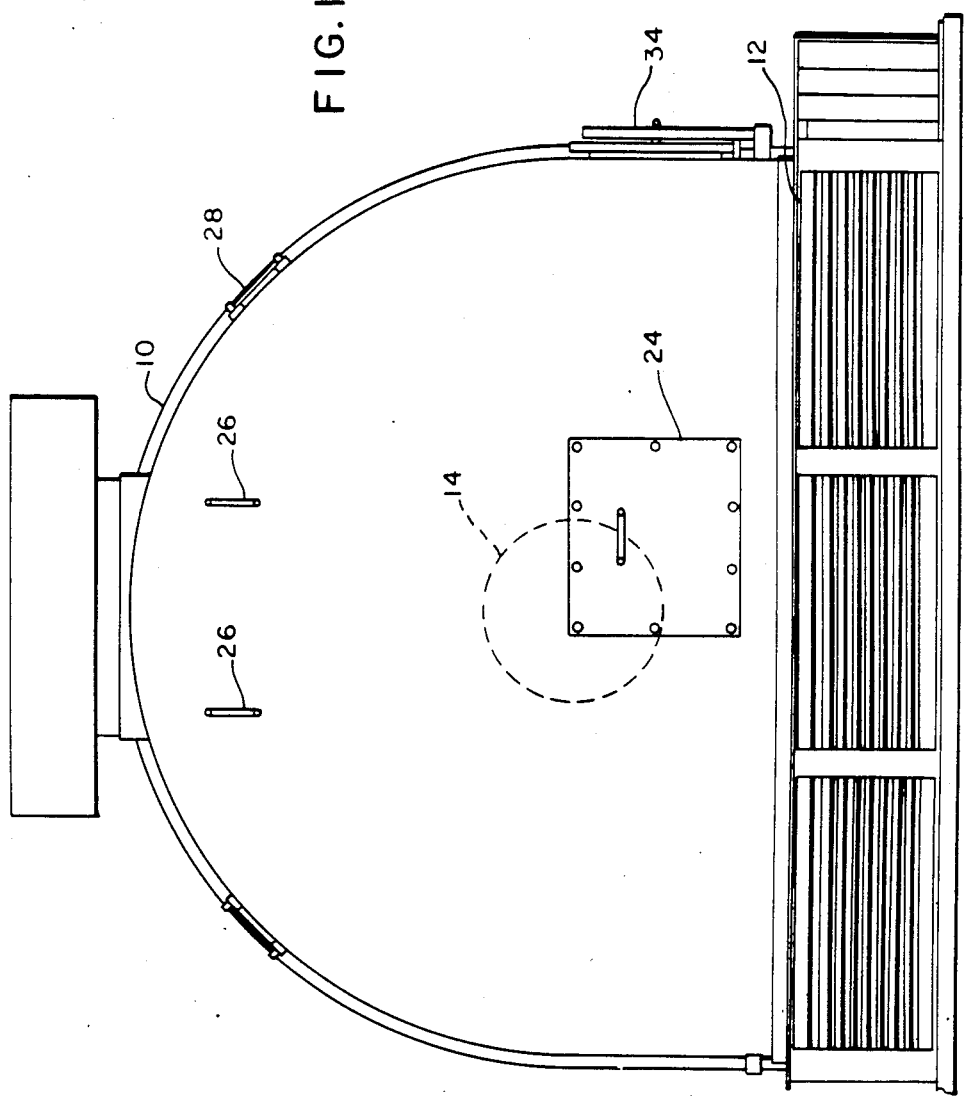
FIGS. 1 and 2 are respectively end and side elevation views of a dynamoelectric machine collector housing in accordance with an embodiment of the present invention.
Figure 2:
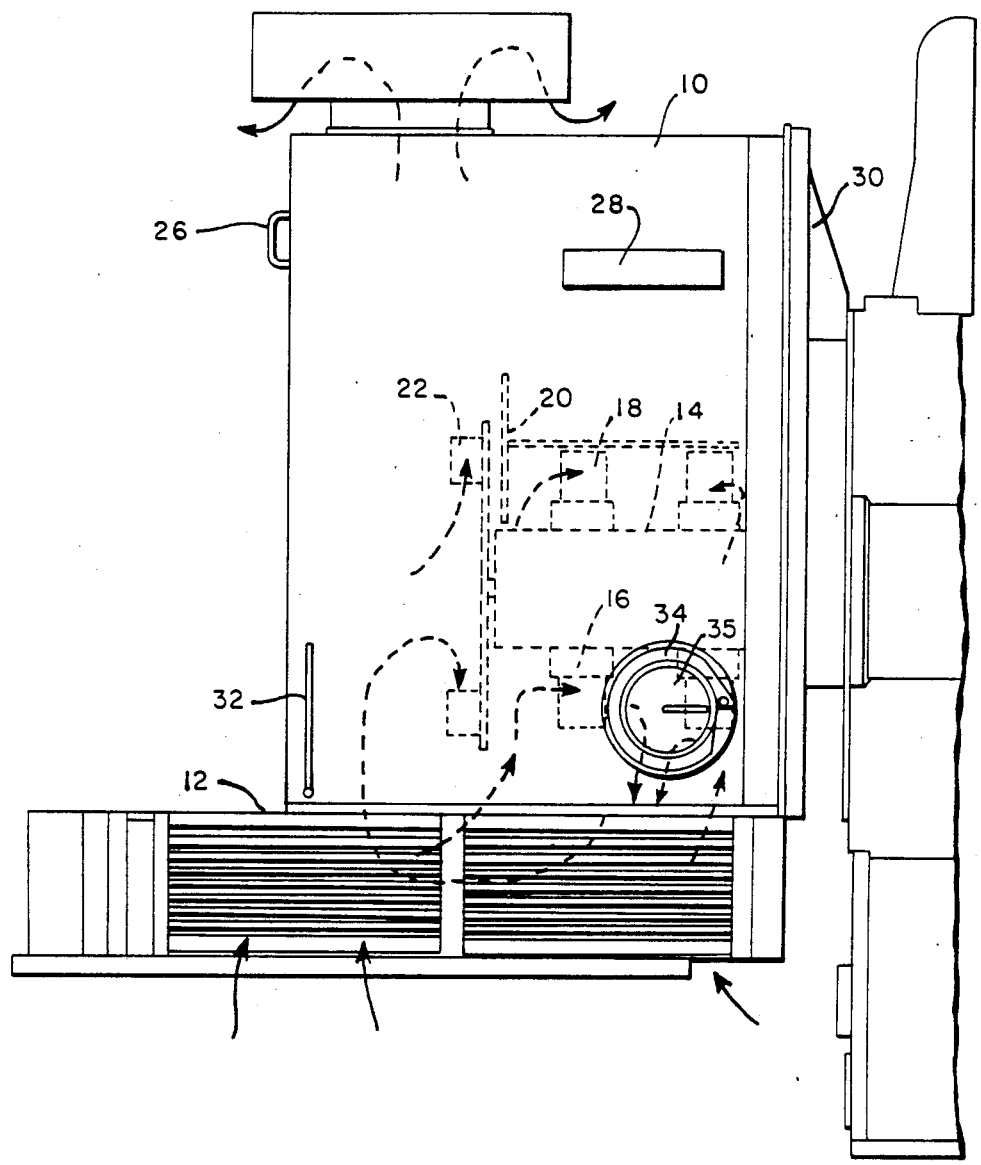

Referring to FIGS. 1 and 2, the collector housing 10 comprises a shell of a generally semicylindrical configuration, resting on a horizontal base 12. A dynamoelectric machine shaft extension extends into the housing 10 and has collector rings 16 associated with brushes 18 that are supported on stationary supports 20. The shaft extension 14 also carries a blower 22 for circulation of air through the housing 10 as indicated by the arrows. The collectors 16, brushes 18, and ventilation system including blower 22 are essentially conventional and may be configured in accordance with well-known practice.

A cover 24 for access to blower balance holes is located on the end face of the housing 10. There are also handles 26 to facilitate housing movement and windows 28 for inspection of the interior of the housing 10. At the front or rotor end of the housing 10 the semicylindrical shell portion abuts against a stationary plate 30 with a rubber seal.

To give an idea of the overall size of the machine, the height of the shell 10 is roughly 5.5 feet and the width dimension is roughly 6 feet. The sealed interface with the stationary plate 30 encompasses a substantial area of about 3300 square inches. With the machine in operation and air flowing through the housing 10 there is a substantial pressure drop below atmosphere pressure or a negative pressure of about 15 to 20 inches of water within the housing connected to the inlet side of the blower. The negative pressure means a considerable force of the order of 2400 lbs. would be required in order to break the seal at wall 30 and move the housing shell 10 by rolling or sliding it back on the baseplate 12 in the absence of the present invention. This movement is in order to allow for close inspection of the collectors 16, taking vibration readings and making brush adjustments while the unit is in service. To aid in this purpose there is a lever 32 provided for working with a cam (not shown) in order to initially push away the housing shell 10 from the stationary plate 30. The use of the lever alleviates the amount of force required but it still remains difficult for persons of moderate strength without a prohibitively long lever. Thus, in accordance with the present invention the foregoing apparatus as been made heretofore is modified by providing a "vacuum breaker" flow control device 34 in the housing shell 10.

The vacuum breaker 34 is essentially a valve having a portal 35 that can be opened with modest force for balancing the pressure within the housing and permitting the breaking of the seal at the interface with wall 30 much more readily. The valve has an opening size of at least about an order of magnitude less than that of the main interface at wall 30. As shown here the portal 35 is a generally circular opening. It may have a diameter of about 10 inches.

FIGS. 3 and 4 show the portal valve 34 in closed and open positions respectively. The portal 35 is a pivot plate secured to a fixed pivot pin 36 at one edge. A closure mechanism such as a wing screw 37 is located substantially opposite the fixed pivot pin. A handle 38 is provided for enabling manual rotation of the pivot plate 35 about the pivot pin 36 when the closure mechanism 37 is released. The rotation of the plate about the pivot pin 36 continues until it reaches a plate stop 39 (FIG. 4) which is a pin extending from the housing shell 10. The portal 35 is readily moved by a generally sliding motion across the surface of the housing shell 10 rather than having to be pulled away from the shell which would require greater force.

It is thus seen that by a simple device the facility with which collector and brush equipment may be inspected and serviced can be greatly facilitated. As larger numbers of turbine generators in use grow older it becomes more important to facilitate their maintenance and the present invention is a contribution to that end, particularly as it facilitates maintenance while the machine is in full operation.

I claim:

1. A dynamoelectric machine collector housing arrangement comprising:

a dynamoelectric machine rotor on a shaft, said shaft having an extended portion axially beyond said rotor;

a set of collector rings on said shaft extended portion;

a set of brushes located for electrical contact with said set of collector rings;

a housing enclosing said shaft extended portion, said collector rings, and said brushes, said housing having at an end thereof adjacent said rotor an interface for forming a breakable seal with a stationary structure;

means for air circulation through the interior of said housing to cool said collector rings and brushes and inherently producing a reduced air pressure in the interior of said housing as compared to that exterior of said housing;

said housing being equipped to allow it to be forced axially away from said interface during machine operation to perform inspections and adjustments of said collectors and brushes;

said housing having a portal valve in a surface thereof for opening prior to said housing being forced away from said interface so said seal at said interface can be broken with moderate force, said portal valve occupying an area of said enclosure surface that is less than that of said interface by at least about an order of magnitude, said portal valve comprising a pivot plate secured to a fixed pivot pin at an edge thereof, a closure mechanism substantially opposite said fixed pivot pin for securing said pivot plate substantially flush against said housing, and a handle for enabling manual rotation of said pivot plate about said pivot pin upon release of said closure mechanism, said pivot plate rotating in a plane substantially parallel to said surface of said housing.

2. A roll back collector housing comprising:

a housing shell enclosing a space in which collector rings and brush rigging of a dynamoelectric machine are located, said housing shell having a first location in which it is in a sealed relation with a fixed housing end wall and a second location in which it is rolled back from said housing end wall to enable inspection and maintenance of said collector rings and brush rigging;

a ventilation system for producing air flow within said housing shell that results in a negative pressure in relation to the exterior;

a manually operated flow control device, for facilitating the interruption of the sealed relation between said housing shell and said end wall, comprising a manually movable plate over an opening in said shell that in less than the area of the interface between said shell and housing end wall by at least about an order of magnitude;

said opening of said flow control device having a fixed screen across it, under said manually movable plate, that prevents entry of extraneous material upon operation of said plate at which time air rushes into said opening.

3. A dynamoelectric machine collector housing arrangement comprising:

a dynamoelectric machine rotor on a shaft, said shaft having an extended portion axially beyond said rotor;

a set of collector rings on said shaft extended portion;

a set of brushes located for electrical contact with said set of collector rings;

a housing enclosing said shaft extended portion, said collector rings, and said brushes, said housing having at an end thereof adjacent said rotor and interface for forming a breakable seal with a stationary structure;

means for air circulation through the interior of said housing to cool said collector rings and brushes and inherently reducing a reduced air pressure in the interior of said housing as compared to that exterior of said housing;

said housing being equipped to allow it to be forced axially away from said interface during machine operations to perform inspections and adjustments of said collectors and brushes;

said housing having a portal valve in a surface thereof for opening prior to said housing being forced away from said interface so said seal at said interface can be broken with moderate force, said portal valve occupying an area of said enclosure surface that is less than that of said interface by at least about an order of magnitude, and a screen being located interiorly of said portal valve to prevent entry of extraneous material as the air pressure within said housing is raised following opening of said portal valve.

4. A roll back collector housing in accordance with claim 2 wherein:

said manually movable plate is secured to a fixed pivot pin at one edge of said plate;

a closure mechanism is located on said plate substantially opposite said pivot pin for securing said pivot plate substantially flush against said housing;

a handle is provided for enabling manual rotation of said plate about said pivot pin when said closure mechanism is released;

and a stop secured to said housing shell limits rotation of said plate about said pivot pin.

* * * * *